United States Patent [19]
Bouis

[11] Patent Number: 5,452,609
[45] Date of Patent: Sep. 26, 1995

[54] WIND TUNNEL HAVING SUBSTANTIALLY PLANAR WALL PORTIONS AND SLOTS

[75] Inventor: Xavier Bouis, Cologne, Germany

[73] Assignee: European Transonic Windtunnel GmbH, Cologne, Germany

[21] Appl. No.: 249,080

[22] Filed: May 25, 1994

Related U.S. Application Data

[63] Continuation of Ser. No. 54,083, Apr. 27, 1993, abandoned.

[30] Foreign Application Priority Data

May 6, 1992 [DE] Germany ............................ 42 14 991.6

[51] Int. Cl.[6] .................................................. G01M 9/00
[52] U.S. Cl. .................................................... 73/147
[58] Field of Search ............................. 73/147; 92/89, 92/90, 97

[56] References Cited

U.S. PATENT DOCUMENTS

| | | | |
|---|---|---|---|
| 2,486,287 | 10/1949 | Jackson | 73/147 |
| 2,560,634 | 7/1951 | Colley | 73/147 |
| 2,788,020 | 4/1957 | Davie, Jr. | 73/147 |
| 2,799,161 | 7/1957 | Green et al. | 73/147 |
| 2,933,922 | 4/1960 | Davis | 73/147 |
| 2,942,460 | 6/1960 | Morgan | 73/147 |
| 4,308,748 | 1/1982 | Jacocks | 73/147 |
| 5,046,358 | 9/1991 | Wulf et al. | 73/147 |

FOREIGN PATENT DOCUMENTS 3524784  12/1988  Germany .

OTHER PUBLICATIONS

Stanewsky, Egon, et al., "The Transonic Wind Tunnel Braunschweig of DFVLR" Z. Flugwiss.Weltraumforsch. 6 (1982), Heft 6, pp. 398–408.

*Primary Examiner*—Richard E. Chilcot, Jr.
*Assistant Examiner*—William L. Oen
*Attorney, Agent, or Firm*—Spensley Horn Jubas & Lubitz

[57] ABSTRACT

A wind tunnel having a plurality of walls surrounding a test section. The walls are provided with a plurality of longitudinal slots. A channel is formed behind each slot. Each channel contains a flexible channel bottom. The shape of the flexible channel bottom may be modified by adjustment devices. The influence of the walls on air flow is thereby decreased and made easier to compute. The influence of the walls on the testing of models is reduced, wind tunnel simulation is improved, and a more accurate and reliable computation of residual influences is provided.

5 Claims, 4 Drawing Sheets

WIND TUNNEL HAVING SUBSTANTIALLY PLANAR WALL PORTIONS AND SLOTS

This is a continuation of application Ser. No. 08/054,083 filed on Apr. 27, 1993, now abandoned.

BACKGROUND OF THE INVENTION

1. Field of the Invention

The invention is directed to a wind tunnel for the testing of objects in subsonic, transsonic and supersonic speed ranges.

2. Description of Related Art

Aerodynamic simulation in wind tunnels is usually perturbed by so-called "wall interference". This wall interference is generated by the walls which surround the flow in a wind tunnel and thus cause a difference from the situation of an airplane in free flight (or any random craft in free surroundings). Due to the presence of such wind tunnel walls, it is either impossible to achieve the desired Mach number of the flow (ratio between speed and sonic speed), and/or the flow field around the test object is influenced unfavorably, i.e. the quality of the simulation is degraded.

Reduction of such perturbations due to the wind tunnel walls and, if possible, their theoretical description and computation, belong to the main concerns of aerodynamicists. Numerous approaches to solve the above problem have been found and tested, but as yet without fulfilling all demands of wind tunnel specialists.

For reducing the influences of the walls and for making these influences calculable, several approaches have been developed. One proposed solution consists in making the walls in the region of the test section porous, to perforate them or to provide them with longitudinal slots of different shapes. All of these three variants have the effect that parts of the main air-mass flow can evade into a kind of hollow cavity around the test section. Such "open" systems provide for considerable reduction of the perturbations caused by the walls; however, it has been found that this approach entails interference noises which degrade the quality of the main flow. Also, considerable difficulties are met when defining the boundary conditions for computation of the residual corrections.

According to a further currently used solution, the walls of a wind tunnel as a whole are arranged to be flexible for adaptation to the respective aerodynmic situation. Such walls are called "adaptive walls". In a rectangular test section, it is comparatively simple to achieve deformation of two mutually confronting walls for thus adapting them to the test object. Although this would allow for obtaining the correct Mach number and also for correction of perturbations of the main flow, it is not possible to reduce the residual span-width effects which occur on the wings of lifting models. Due to technical restrictions, simultaneous adaptation through deformation of four walls can hardly be realized in practice. Further, using adaptive walls requires a very high positional accuracy of these walls in case of high subsonic Mach numbers, so that the use of adaptive walls in large tunnels, especially under variable temperature conditions, becomes considerably more difficult because of mechanical complexity. By using a combination of flexible octogonal walls having boundary surfaces consisting of sliding slabs, the wall interferences are clearly reduced, but this advantage involves massive mechanical difficulties. Moreover, these flexible octogonal walls have not been tested yet on their fitness for the supersonic range.

From the periodical "Flugwiss. Weltraumforschung", No. 6, 1982, pp. 398–408, there is known a transsonic wind tunnel having longitudinal slots formed in its walls. For reduction of wall interferences, the slots on the inner sides of the walls have thin aluminium stripes bonded thereon, leaving a small gap having a width of 1.75 mm. In this known wind tunnel, individual adaptation to the test model is not possible. Furthermore, the thin alumnium stripes are not sufficiently stable in shape.

German Patent 35 24 784 C2 discloses a transsonic wind tunnel with perforated walls wherein plates are arranged behind the walls, the distance of the plates to the walls being variable for minimizing the wall interferences through adaptive adjustment of the plates.

All of the above outlined concepts suffer from the disadvantage that they necessitate extensive alterations in the wind tunnel walls so that the tunnels can be retrofitted only with difficulties or not at all.

It is an object of the invention to provide a wind tunnel wherein the flow conditions on the walls of the test section are influenced in such a manner that the areodynmic situation generated in the central region of the test section is largely identical to free flight conditions (i.e. those prevailing without limiting walls).

SUMMARY OF THE INVENTION

The wind tunnel of the invention, instead of utilizing the conventional movement or deformation of the whole walls, is provided with only a small number of flexible plates, each of said flexible plates forming the bottom of a channel extending in parallel to the test section of the wind tunnel. These channels have fixed side walls so that the boundary conditions for flow computations are precisely defined and known. With regard to the number of channels, the wind tunnel test section is arranged in the same manner as a conventional test section with slotted walls. Within the tunnel walls, the flexible plates are deformable and movable, respectively. On principle, the distance covered by the deformation or movement will amount to merely a few percent of the width or the height of the test section, its precise value depending on the Mach number and the size and shape of the model. The width and the number of the channels must be sufficiently large for obtaining the desired effect. Typical values range from 3 to 6 channels per wall, while the overall opening area exceeds 3%, and preferably 5%, of the wall area. Deviating from these values might be acceptable in particular situations if the depth-to-width ratio of the channels does not become excessive.

For effecting a complete compensation of the three-dimensional effects of the wall, all of the four walls of the wind tunnel should have channels with an adjustable bottom or inlet plate. Preferably, the channels are of rectangular cross section for allowing unhindered movement of the inlet plates between the parallel sides.

Movement of the flexible bottom inlet plates of the channels can be performed by linear drives and cams or the like. The number of the points of application for the adjusting members on each plate, which has to be optimized for best results, lies between 1 and slightly more than 10. The positional accuracy is in inverse proportion to the open area of the walls; therefore, it is reached much easier than for the full walls.

The optimum deflection of the flexible plates can be determined empirically or can be obtained according to special computation methods. An easy way for reaching a good result consists in using the so-called area law of the test model to thus compensate for areodynmic blockage effects of the tunnel. Additionally, use can be made of data given by a proper pressure difference or by the lift of the model in order to adjust the channels for compensation of the wall interferences generated by this lift. Residual corrections can then be obtained by suitable computation programs as used also in case of closed test section walls.

A more elaborate method for tuning the position of the flexible plates is to use one of the wall-interference computation programs in an optimization process based on minimizing of the residual effects at a number of control points arranged around the model.

The invention offers the following advantages:

Full three-dimensional cancellation of wall interference at subsonic Mach numbers is achievable for any type of model and test section configuration.

Calculation of residual corrections, if any, is possible with existing mathematical models.

Accuracy of adjustment and repeatability of positioning can be maintained at a high level.

Low energy consumption is obtained by low energy losses.

Aerodynamic noise is reduced.

Simple, stepwise and reversible retrofit is possible to a large number of existing wind tunnels of various geometrical configurations of the test section.

Cost of implementation or retrofit is lower than for other already known concepts (e.g. adaptive walls).

Windows and similar wall equipment in the region of the test section walls can be maintained.

During test runs, immediate areodynamic comparison is possible with a reference solid wall situation by reducing the depth of the channels to zero.

Good supersonic conditions can be established if the wind tunnel is equipped with a flexible nozzle (however not in the immediate vicinity of Mach 1 because of shock reflections on the model).

The channels are not intended for the generation of vorticity; instead, they provide a quasi-inviscid flow in order to simplify theoretical approaches. To this purpose, the contour of the channels is preferably set in such a manner that its bottom continuously and steadily declines from the entry side. The radius of the edges formed by the channels together with the respective test section wall increases from about zero at the entry side up to its maximum value which is reached substantially at a point slightly upstream of the test object. In this manner, the danger of a flow separation is kept under control. A further improvement can be achieved when vorticity is reduced by boundary layer suction, e.g. by arranging for a slight porosity of the flexible plates and creating some vacuum force behind them. In conventional, slotted walls of the test section, the vacuum is generated in that flaps, arranged downstream of the test section, are opened to a suitable extent for effecting the so-called "plenum suction". As compared to the deformation of the plates, the above porosity leads to flow perturbations of the second order.

The invention is applicable in subsonic wind tunnels and particularly in transsonic wind tunnels operating in the range of sonic speed, but can be applied also in supersonic wind tunnels. The reduction of the wall effects on the flow in the test section as achieved by the invention, is obtained also in Kryo tunnels wherein the gas flow has low temperatures, e.g. ranging from −100° C. to −200° C.

Embodiments of the invention will be explained in greater detail hereunder with reference to the drawings.

DESCRIPTION OF THE PREFERRED EMBODIMENTS

Figure 1:
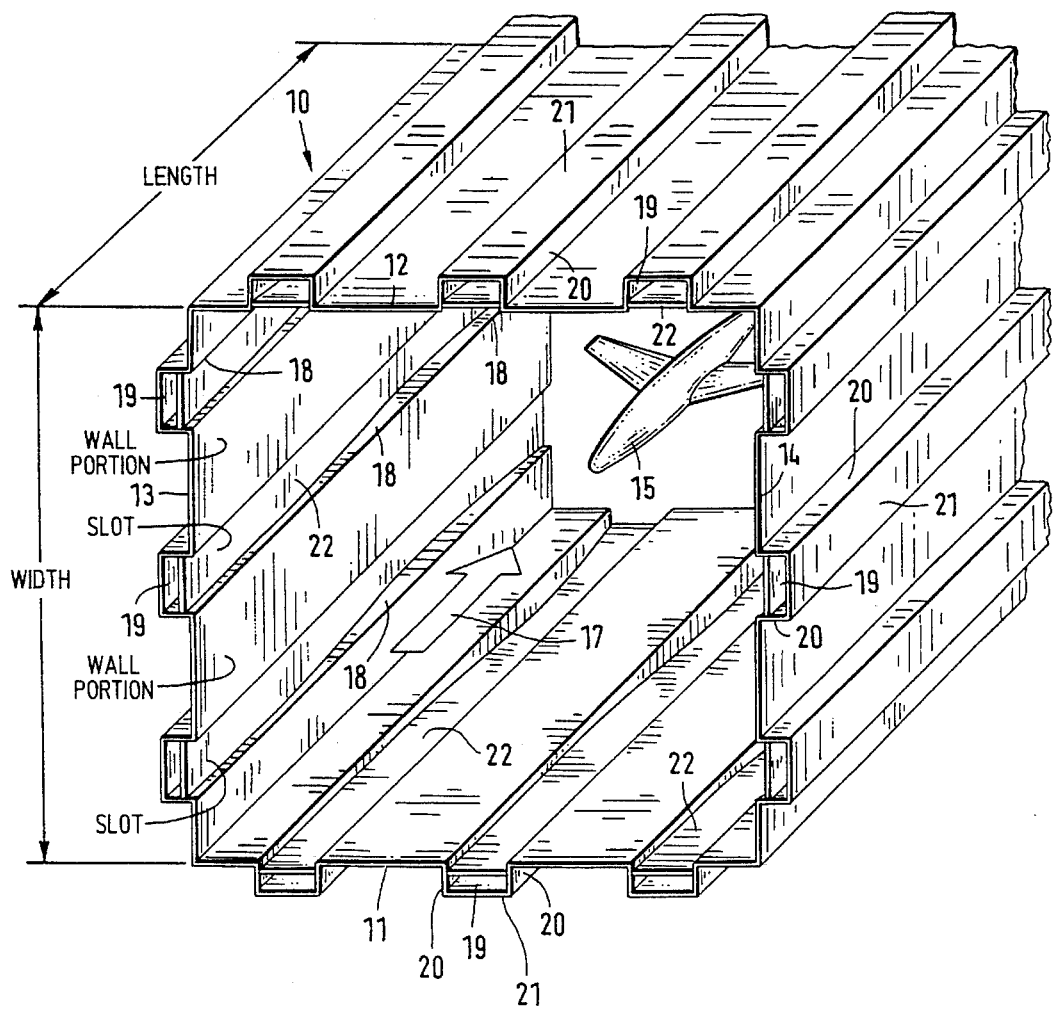
FIG. 1 shows a schematical perspective view of the test section of a wind tunnel.
Figure 2:
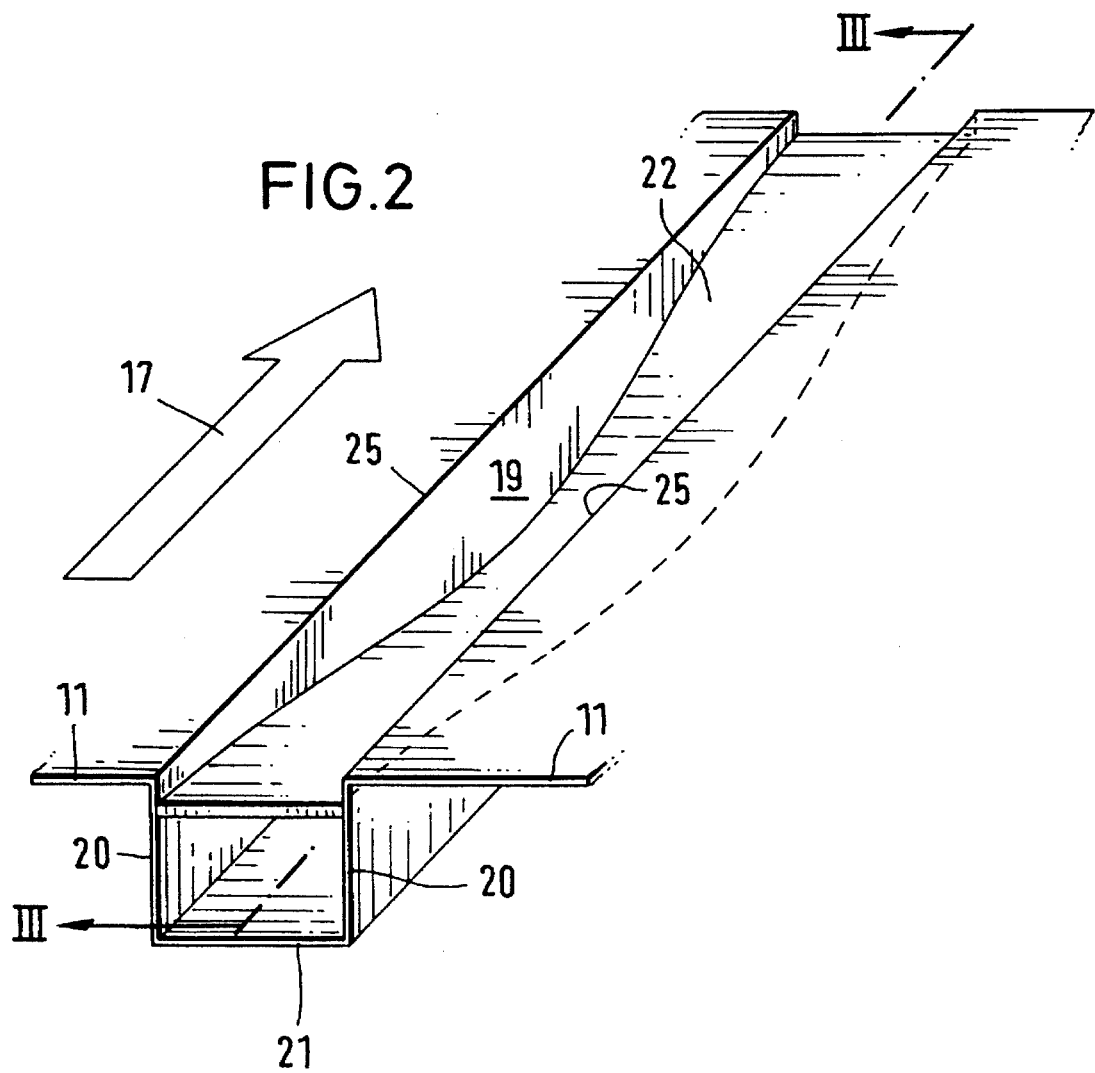
FIG. 2 shows a perspective view of a channel and the tunnel arranged therebehind in a test section wall of a wind tunnel.

According to FIG. 1, the space of the test section of a wind tunnel 10 is delimited by four walls, notably a bottom wall 11, an upper wall 12 and two side walls 13 and 14. In the instant embodiment, the walls 11 to 14 are plane walls enclosing a rectangular cross section. Within the wind tunnel 10, the test model 15, e.g. the model of an airplane, is fixed at a distance from the walls. The holding device required to this purpose is omitted in FIG. 1 for reasons of clarity. The wind direction is shown by an arrow 17.

For reducing the effects which the wind tunnel walls exert on the flow conditions, the walls 11 to 14 have longitudinally extending slots formed therein, running along the whole length of the test section and having a width of about 2 to 10 cm in case of a test section width of about 2.4 m. In the illustrated embodiment, each wall includes three slots 18.

Behind each slot 18, there is arranged a U-shaped channel 19 having two closed rigid side walls 20 which are interconnected by a rigid channel bottom 21 and depart from the edges of slot 18 in rearward direction.

Each of said channels 19 has arranged therein a longitudinal flexible false bottom 22 extending above channel bottom 21 and extending from one side wall 20 to the opposite side wall, thus filling the width of channel 19. Bottom 22 comprises a strip of metal, plastics or some other flexible material. Bottom 22 is arranged in such a manner within channel 19 that its distance from the channel bottom 21 can be locally changed without variations of this distance occuring in lengthwise direction.

Figure 3:
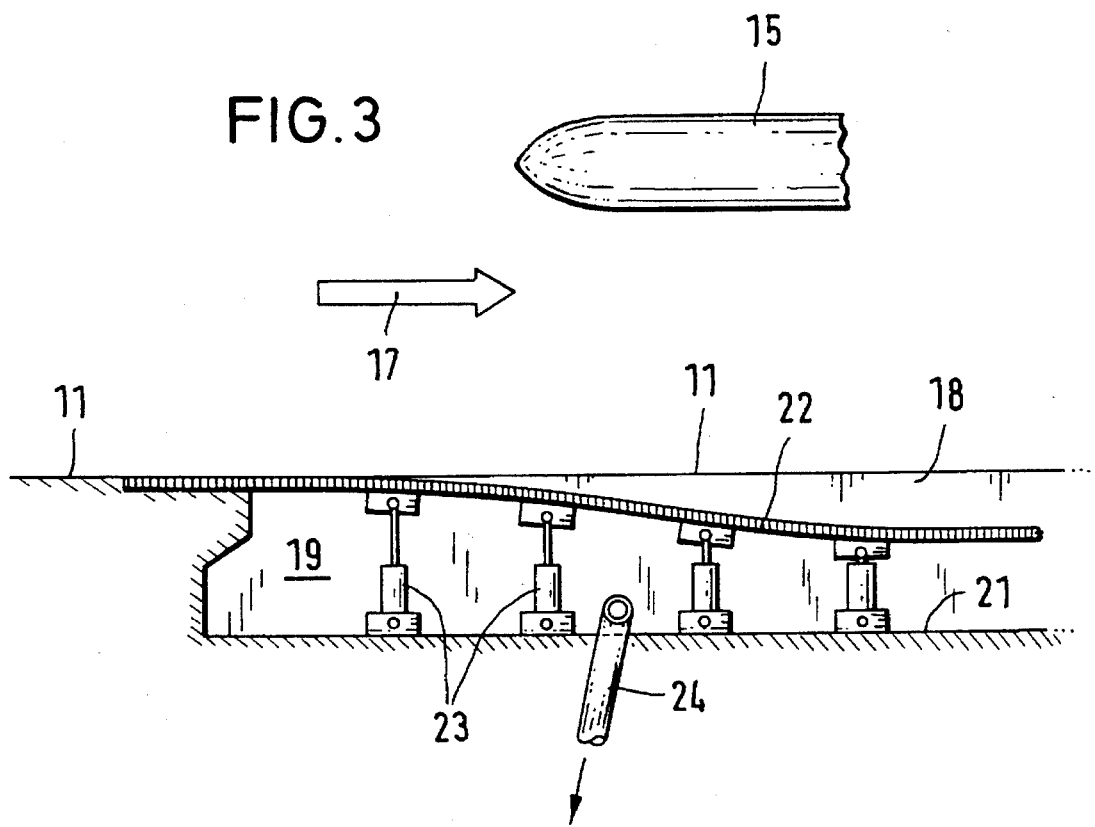
FIG. 3 shows a sectional view along the line III— III of FIG. 2.

FIG. 3 shows a row of linear adjustment devices 23 which are respectively supported on channel bottom 21 and engage the outer side of bottom 22. Each of said adjustment devices 23 can be set to a different position so as to vary the distance of bottom 22 to channel bottom 21. Thereby, a desired course of bottom 22 within channel 19 can be realized by suitable setting of the adjustment devices 23. In the fully extracted position of adjustment devices 23, bottom 22 is flush with the respective wall of the wind tunnel test section so that a plane wall surface is generated.

In the embodiment of FIG. 3, bottom 22 comprises a plate of porous or perforated material. Within channel 19, there is disposed a suction device 24 for sucking gas out of the channel. Since channel 19 is closed on both of its end sides, a suction is generated in a direction through the porous wall 22. Thereby, the boundary layer forming on the surface of bottom 22 is sucked off.

Figure 4:
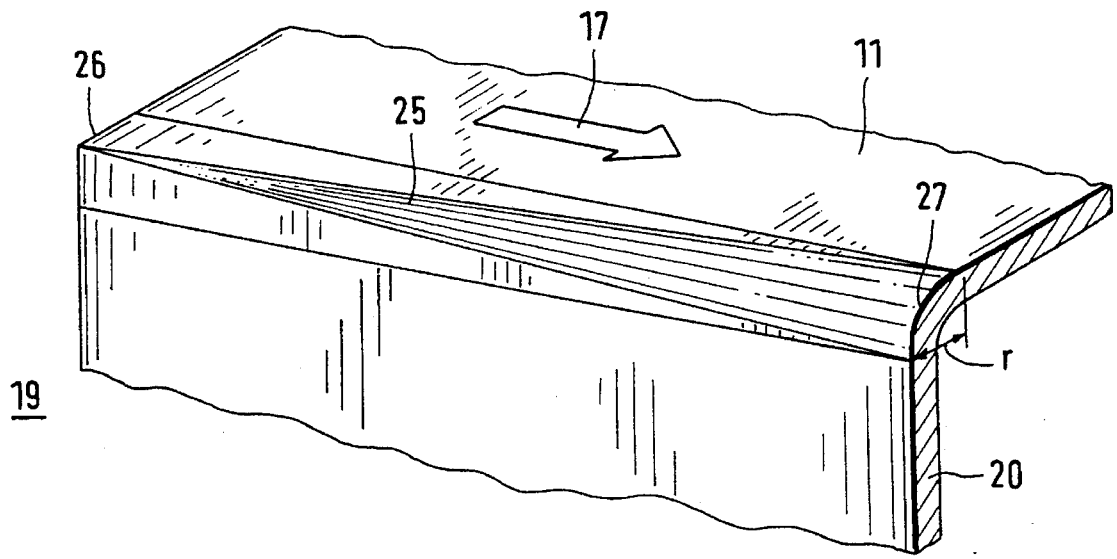
FIG. 4 shows a perspective view of the channel edge, with the edge radius widening in flow direction.

FIG. 4 illustrates the edge 25 of a channel 19, i.e. the corner region between a channel wall 11 and the adjacent side wall 20 of a channel 19. Edge 25 is of a rounded shape, the radius of the rounded portion of edge 25 being almost zero at the upstream end 26 of the test section and increasing continuously in flow direction. At a location 27 closely before the test model, the edge radius r has attained its maximum value of about 10 mm, based on a width of the test section of about 2.4 m.

I claim:

1. A wind tunnel, comprising:

a plurality of substantially planar wall portions defining a test section having a surface, a substantially longitudinal slot interposed between at least two of the wall portions along the surface of the test section, the two wall portions between which the slot is interposed each defining a width, the slot defining a width that is smaller than the width defined by each of the two wall portions between which the slot is interposed a laterally closed channel arranged in the slot, the laterally closed channel having a flexible channel bottom, the flexible channel bottom defining at least a portion of the surface of the test section, and adjustment means for varying the shape of the flexible channel bottom and for retaining the flexible channel bottom in a substantially fixed position relative to the test section.

2. The wind tunnel of claim 1, wherein the test section defines a flow direction, wherein the slot and at least one of the wall portions mutually define an edge, wherein the edge defines an edge radius, and wherein the edge radius along at least a portion of the slot increases in the flow direction.

3. The wind tunnel of claim 1, wherein the flexible channel bottom comprises at least one of a porous material and a perforated material, and further comprising suction means for evacuating gas from the channel.

4. The wind tunnel of claim 1, wherein the plurality of walls define a wall area, wherein the wall area has a plurality of substantially longitudinal slots formed therein, and wherein the plurality of slots formed in the wall area occupy at least approximately 3% of the wall area.

5. The wind tunnel according to claim 1, wherein the flexible channel bottom comprises a first channel bottom, wherein the channel comprises a pair of substantially fixed side walls and a substantially fixed second channel bottom, and wherein the flexible first channel bottom and the substantially fixed second channel bottom are arranged in spaced relationship.

* * * * *